US011646869B1

(12) United States Patent
Tamosiunas

(10) Patent No.: US 11,646,869 B1
(45) Date of Patent: May 9, 2023

(54) STATELESS SYSTEM TO RESTORE ACCESS

(71) Applicant: UAB 360 IT, Vilnius (LT)

(72) Inventor: Edvinas Tamosiunas, Kaunas (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/897,158

(22) Filed: Aug. 27, 2022

(51) Int. Cl.
*H04L 9/08* (2006.01)
*H04L 9/14* (2006.01)
*H04L 9/30* (2006.01)

(52) U.S. Cl.
CPC .............. *H04L 9/0819* (2013.01); *H04L 9/14* (2013.01); *H04L 9/30* (2013.01)

(58) Field of Classification Search
CPC ............ H04L 9/0819; H04L 9/14; H04L 9/30
See application file for complete search history.

(56) References Cited

U.S. PATENT DOCUMENTS 10,129,221 B1* 11/2018 McClendon .......... H04L 9/0825
11,502,826 B1* 11/2022 Valkaitis ............... H04L 9/0869
2009/0016537 A1* 1/2009 Ju ..................... H04N 21/25816
380/278
2010/0100721 A1* 4/2010 Su .......................... H04L 9/0891
380/278
2013/0174223 A1* 7/2013 Dykeman ............... G06F 21/10
726/4
2015/0358158 A1* 12/2015 Fadaie .................. H04L 9/0838
713/171

* cited by examiner

Primary Examiner — Abiy Getachew
(74) Attorney, Agent, or Firm — The Pattani Law Group

(57) ABSTRACT

A method including determining, by a first user device, encrypted content by encrypting content based on a first private key; encrypting, by the first user device, the first private key based on utilizing a second public key associated with a second user device; transmitting, by the first user device to a storage device, the encrypted content and the encrypted first private key for storage in association with a first account; receiving, by the second user device from storage device, the encrypted content and the encrypted first private key when the first user device is unable to access the encrypted content; decrypting, by the second user device, the encrypted first private key and the encrypted content based on a second private key; and transmitting, by the second user device to the first user device, the content to restore access to the content by the first user device is disclosed.

20 Claims, 7 Drawing Sheets

STATELESS SYSTEM TO RESTORE ACCESS

FIELD OF DISCLOSURE

Aspects of the present disclosure generally relate to use of computer hardware and/or software to manage data, and in particular to providing a stateless system to restore access.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method including determining, by a first user device, encrypted content by encrypting content based at least in part on utilizing a first private key associated with the first user device; encrypting, by the first user device, the first private key based at least in part on utilizing a second public key associated with a second user device; transmitting, by the first user device to a storage device, the encrypted content and the encrypted first private key for storage in association with a first account registered by the first user device with the infrastructure device; receiving, by the second user device from the storage device, access to the encrypted content and the encrypted first private key based at least in part on a determination that the first user device is unable to access the encrypted content; decrypting, by the second user device, the encrypted first private key and the encrypted content based at least in part on utilizing a second private key associated with the second user device; and transmitting, by the second user device to the first user device, the content to restore access to the content by the first user device.

In another aspect, the present disclosure contemplates a system comprising a first user device; and a second user device associated with the first device, wherein the first user device is configured to determine encrypted content by encrypting content based at least in part on utilizing a first private key associated with the first user device; the first user device is configured to encrypt the first private key based at least in part on utilizing a second public key associated with a second user device; the first user device is configured to transmit, to a storage device, the encrypted content and the encrypted first private key for storage in association with a first account registered by the first user device with the infrastructure device; the second user device is configured to receive, from the storage device, access to the encrypted content and the encrypted first private key based at least in part on a determination that the first user device is unable to access the encrypted content; the second user device is configured to decrypt the encrypted first private key and the encrypted content based at least in part on utilizing a second private key associated with the second user device; and the second user device is configured to transmit, to the first user device, the content to restore access to the content by the first user device.

In another aspect, the present disclosure contemplates a non-transitory computer readable medium storing instructions, which when executed by a first user device, configure the first user device to determine encrypted content by encrypting content based at least in part on utilizing a first private key associated with the first user device; encrypt the first private key based at least in part on utilizing a second public key associated with a second user device; and transmit, to a storage device, the encrypted content and the encrypted first private key for storage in association with a first account registered by the first user device with the infrastructure device; and when executed by a second user device, configure the second user device to: receive, from the storage device, access to the encrypted content and the encrypted first private key based at least in part on a determination that the first user device is unable to access the encrypted content; decrypt the encrypted first private key and the encrypted content based at least in part on utilizing a second private key associated with the second user device; and transmit, to the first user device, the content to restore access to the content by the first user device.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
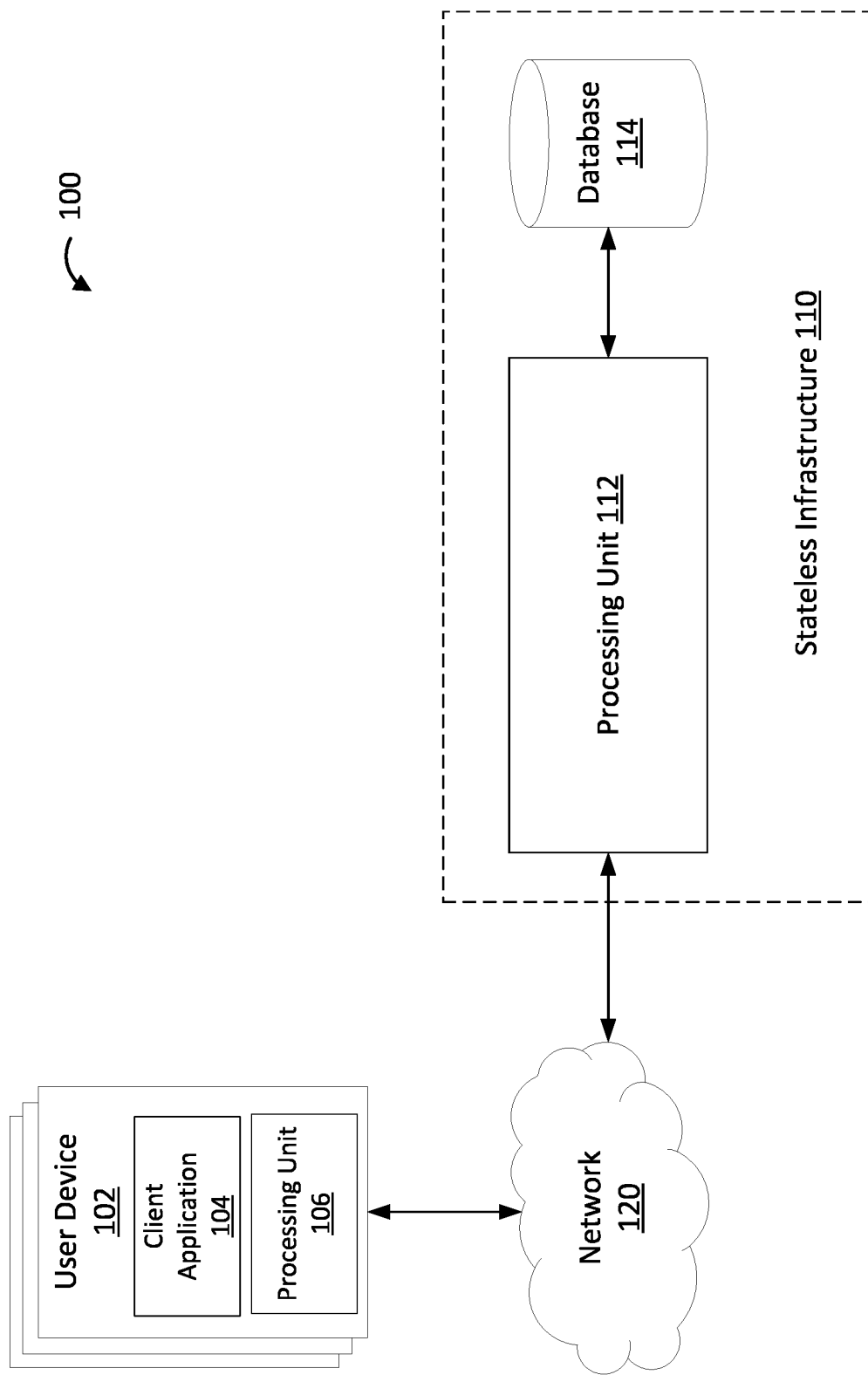

FIG. 1 is an illustration of an example system associated with a stateless system to restore access, according to various aspects of the present disclosure.

Figure 2:
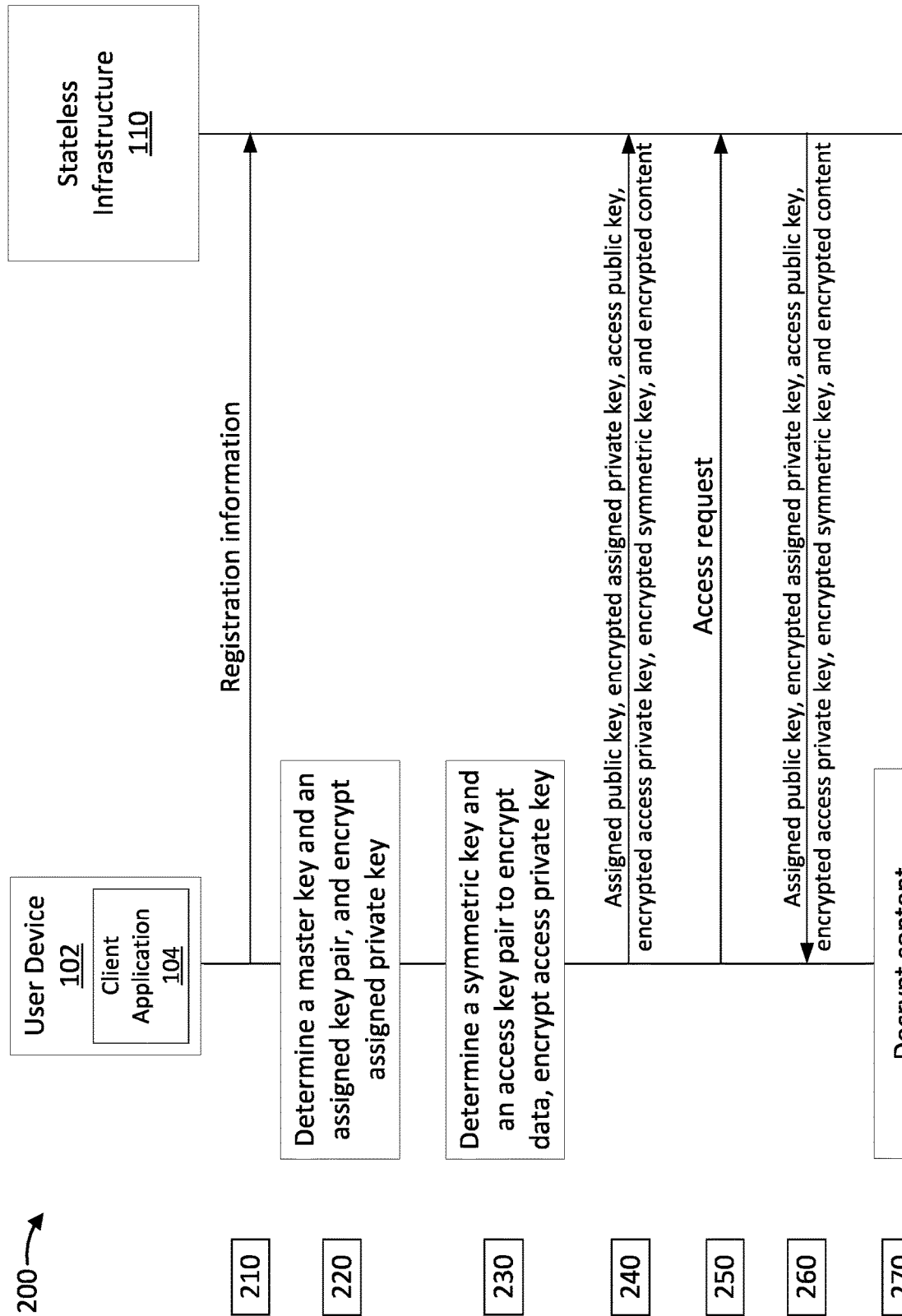

FIG. 2 is an illustration of an example flow associated with a stateless system to restore access, according to various aspects of the present disclosure.

Figure 3:
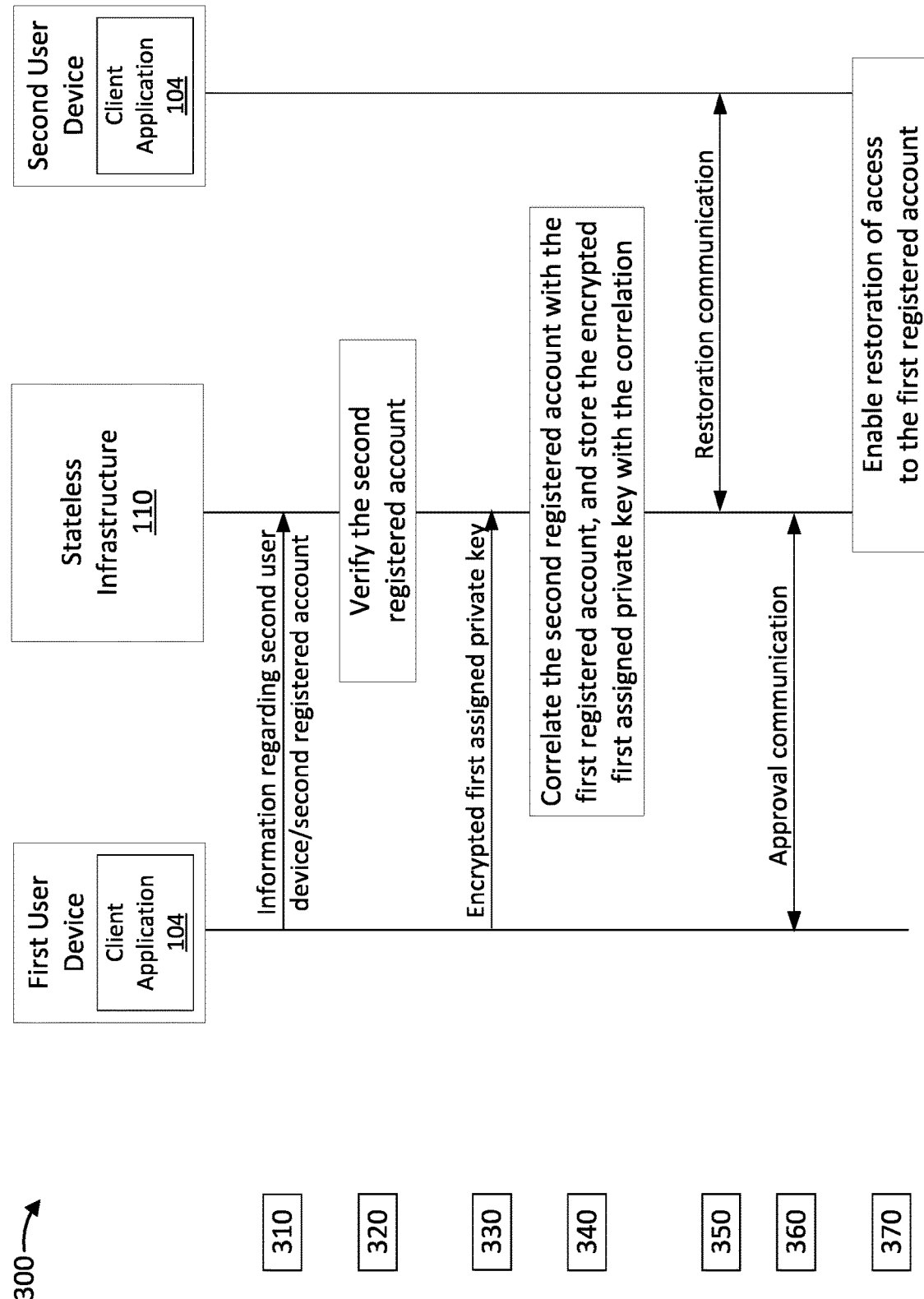

FIG. 3 is an illustration of an example flow associated with a stateless system to restore access, according to various aspects of the present disclosure.

Figure 4:
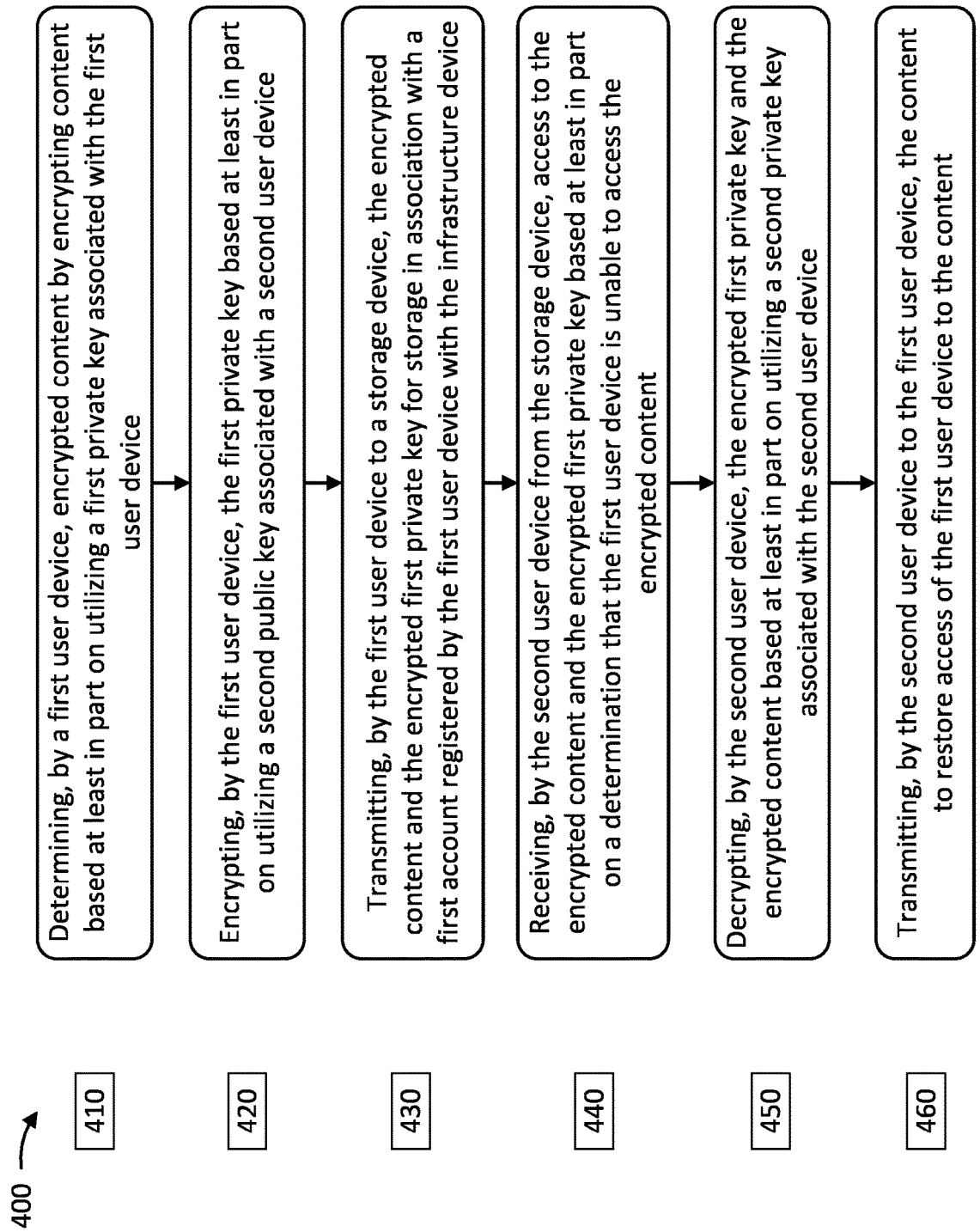

FIG. 4 is an illustration of an example process associated with a stateless system to restore access, according to various aspects of the present disclosure.

Figure 5:
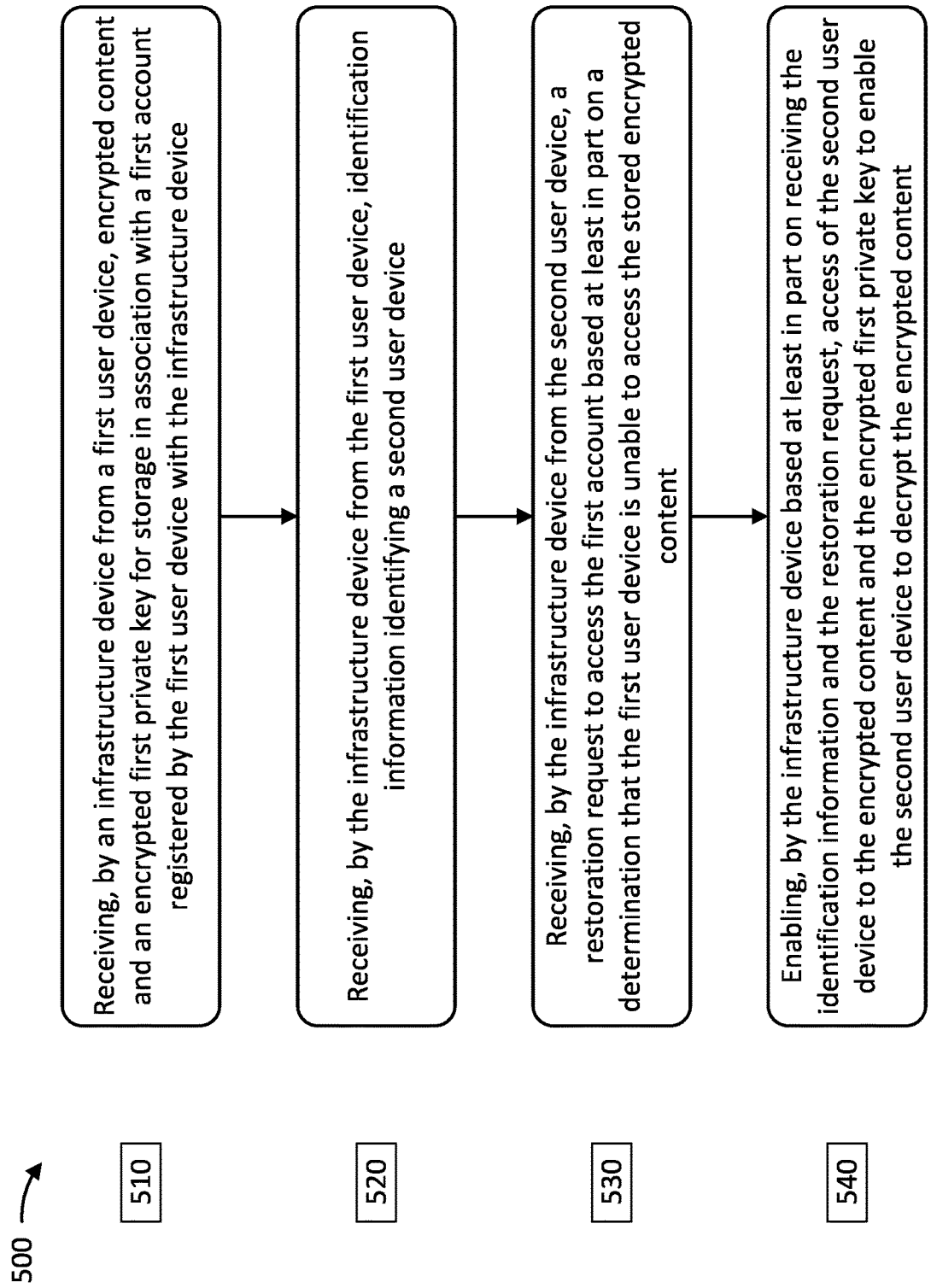

FIG. 5 is an illustration of an example process associated with a stateless system to restore access, according to various aspects of the present disclosure.

Figure 6:
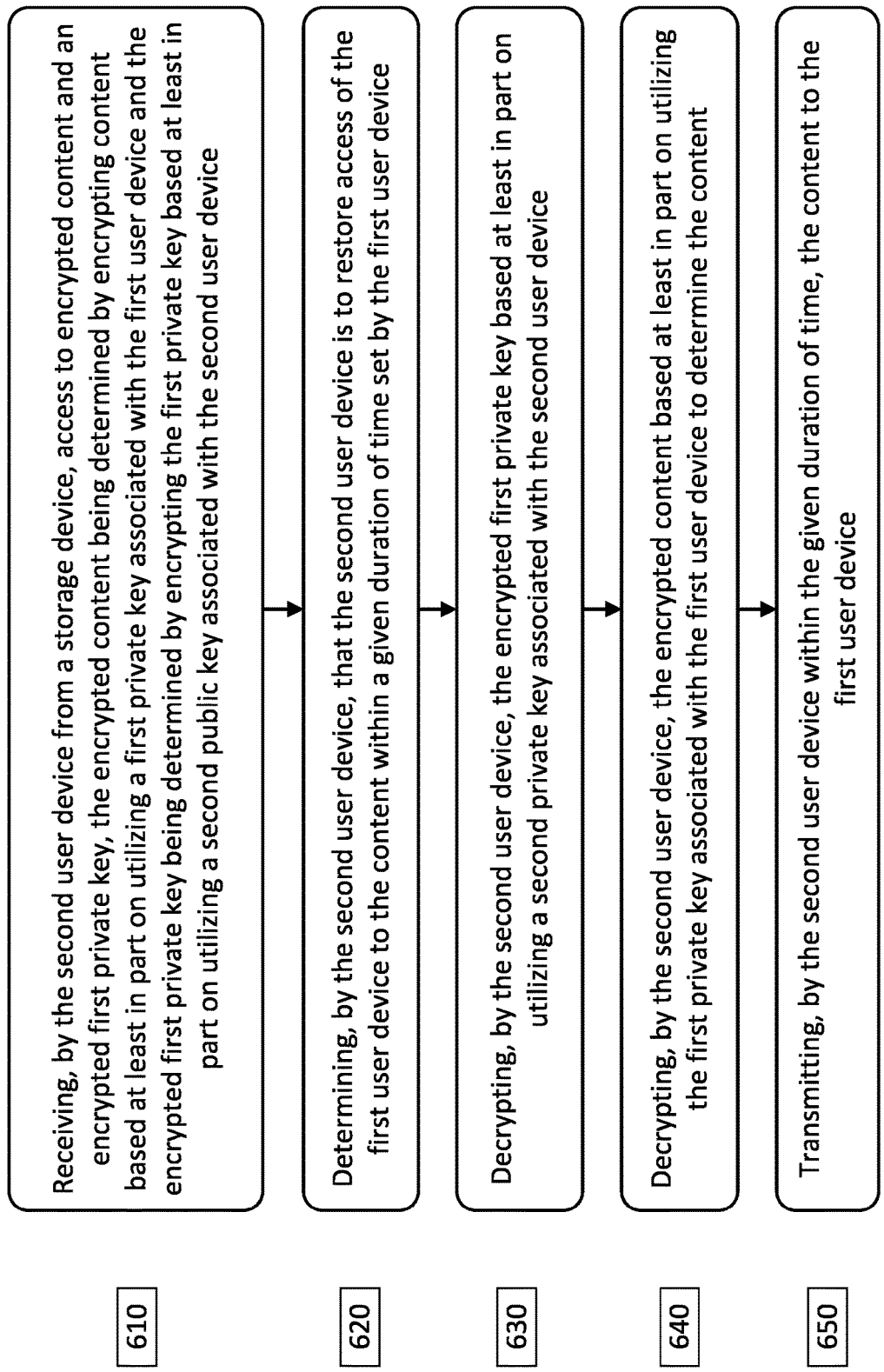

FIG. 6 is an illustration of an example process associated with a stateless system to restore access, according to various aspects of the present disclosure.

Figure 7:
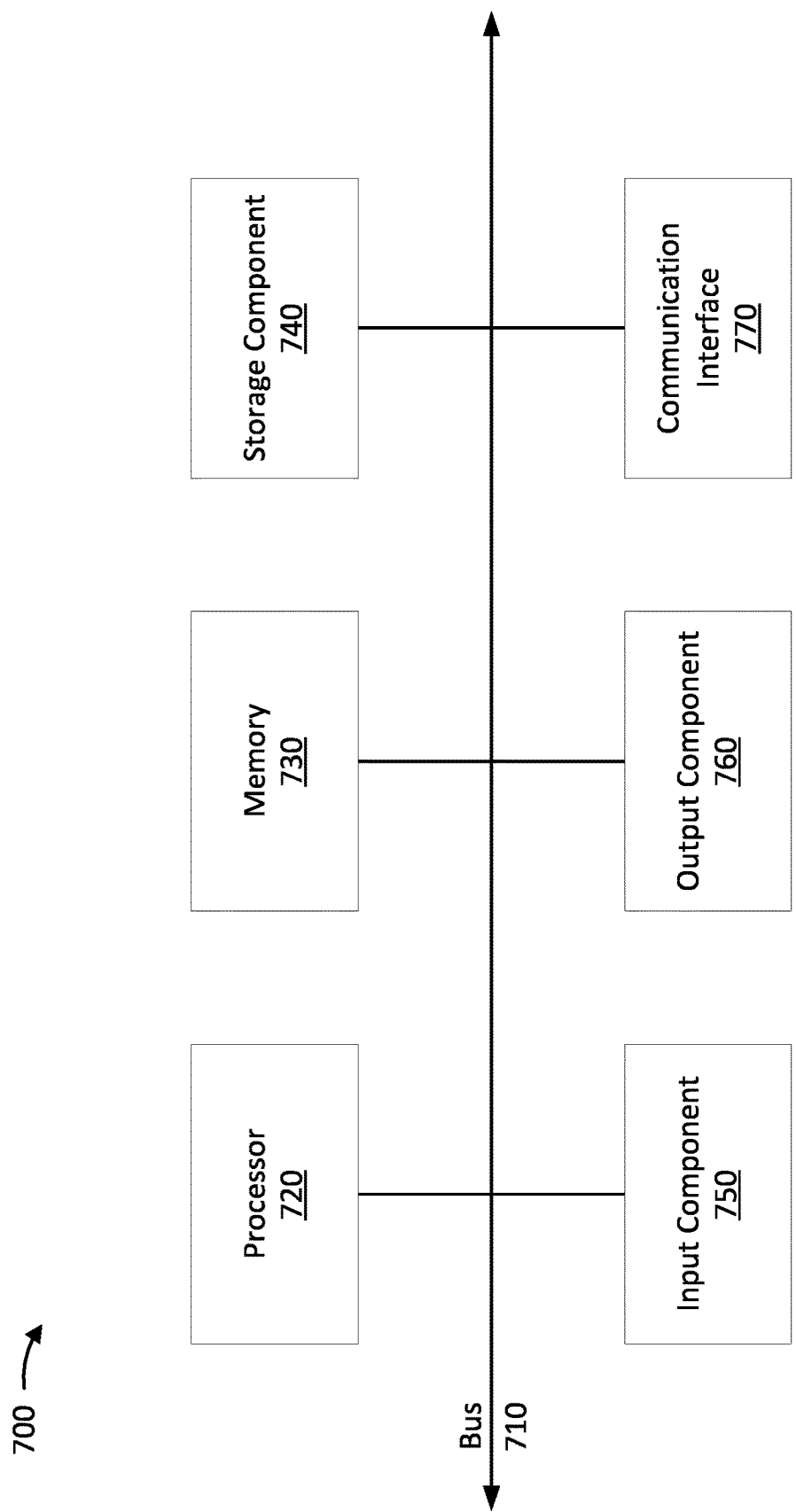

FIG. 7 is an illustration of example devices associated with a stateless system to restore access, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with providing a stateless system to restore access, according to various aspects of the present disclosure. The system 100 includes one or more user devices 102 communicating with a stateless infrastructure 110, including a processing unit 112 and a database (e.g., memory) 114. A user device 102 may include a processing unit 106 and may utilize an installed client application 104 to communicate with an application programming interface (API) (not shown) included in the stateless infrastructure 110. In some aspects, the user device 102 and the stateless infrastructure 110 may communicate with one another over a network 120.

The user device 102 may be a physical computing device capable of hosting a client application and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the stateless infrastructure 110 may configure and provide the user device 102 with a client application 104 to be installed on the user device 102. The client application 104 may enable a processor (e.g., processing unit 106, processor 720) associated with the user device 102 to encrypt and decrypt data. In some aspects, the client application 104 and/or the stateless infrastructure 110 may utilize one or more encryption and decryption algorithms to encrypt and decrypt the data. The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of encryption algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

In some aspects, data may include any information such as private information including, for example, bank account numbers, credit card numbers, various passwords, etc. In some aspects, the data may include electronic information included in files such as, for example, photographs, documents, compact discs (CDs), digital video disks (DVDs), etc. including written, printed, and/or electronic matter that provides information and/or evidence.

The stateless infrastructure 110 may include the processing unit 112 and the database 114. The processing unit 112 may include a logical component configured to perform complex operations to evaluate various factors associated with encrypting and decrypting the data. The database 114 may store various pieces of information associated with encrypting and decrypting the data, including encrypted content and/or encrypted key information. In some aspects, the stateless infrastructure 110 may include an application programming interface (API) (not shown) to communicate with the client application 104. The stateless infrastructure 110 may include or be associated with a communication interface to communicate (e.g., transmit and/or receive) data.

The network 120 may be a wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

One or more components (e.g., processing units, security database, client applications, etc.) included in example 100 shown in FIG. 1 may further be associated with a controller/ processor, a memory, a communication interface, or a combination thereof (e.g., FIG. 7). For instance, the one or more components may include or may be included in a controller/ processor, a memory, or a combination thereof. In some aspects, the one or more components included may be separate and distinct from each other. Alternatively, in some aspects, the one or more of the components may be combined with one or more of the other components. In some aspects, the one or more of the components may be local with respect to one or more of other components. Alternatively, in some aspects, the one or more of the components may be located remotely with respect to one or more of other components. Additionally, or alternatively, the one or more components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another one or more of the components.

As indicated above, FIG. 1 is provided as an example. Other examples may differ from what is described with regard to FIG. 1.

A user device may request data storage services from a data storage service provider (DSSP). Such data storage services may include cloud storage services that enable the user device to utilize, for example, the Internet to store data on remote servers and/or storage devices managed by the DSSP. The data storage services may also be referred to as cloud backup services, online data storage services, online drive storages, file hosting services, file storage services, or the like. The DSSP may attempt to protect the stored data by requiring the user device to register an account with the DSSP and to provide credentials to gain authorized access to the registered account and/or to the stored data.

In some instances, the DSSP may fail to protect the stored data. In an example, a third party may gain unauthorized access to the stored data by, for example, hacking into the servers and/or storage devices managed by the DSSP. In another example, internal devices associated with the DSSP that have access to the servers and/or storage devices managed by the DSSP may gain unauthorized access to the stored data. As a result, an integrity associated with the stored data may be compromised. To regain access to the stored data and/or to protect the stored data, the user device and/or the DSSP may expend resources (e.g., management resources, memory resources, computational/processing resources, power consumption resources, system bandwidth, network resources, etc.) that may otherwise be used for more suitable tasks associated with the data storage services.

In some instances, the user device may lose access to the registered account when, for example, the credentials associated with gaining authorized access to the registered account are lost and/or misplaced. In an example, a user of the user device with knowledge of the credentials may forget the credentials and/or become incapacitated (e.g., pass away) such that the credentials become unrecoverable. In this case, the user device may lose access to the registered account and/or to the stored data. To enable the user device to recover access to the registered account, the DSSP may transmit a recovery link by utilizing contact information (e.g., email address, etc.) provided by the user device.

However, the user may not be able to utilize the recovery link when the user is incapacitated. Further, such use of the recovery link may not be protected by encryption, and, therefore, susceptible to unauthorized access by a malicious party that may utilize the recovery link to gain unauthorized access to the registered account and/or to the stored data.

Simply resetting the credentials may not be feasible because doing so may result in a loss of all data stored in association with the registered account. In such cases, the user device and/or the DSSP may expend resources (e.g., management resources, memory resources, computational/processing resources, power consumption resources, system bandwidth, network resources, etc.) to restore access to the stored data and/or to protect the stored data that may otherwise be used for more suitable tasks associated with the data storage services.

Various aspects of systems and techniques discussed in the present disclosure provide a stateless system to restore access. In some aspects, a DSSP may provide a stateless system including a stateless infrastructure and/or a client application installed on a user device. In some aspects, the stateless infrastructure may configure and provide the user device with the client application. The client application may enable the user device to register an account with the stateless infrastructure and to store data. Further, the client application may enable the user device to encrypt and decrypt the stored data. In an example, the client application may enable the user device to encrypt data, to store the encrypted data, and to decrypt the encrypted data. In some aspects, the user device may encrypt the data, store the encrypted data, and decrypt the encrypted data without the stateless infrastructure having access to and/or storing unencrypted data. As a result, even if a third party or a malicious party gains unauthorized access to the stateless infrastructure, the unauthorized access may lead to encrypted data, which the third party or the malicious party may not be able to decrypt. The client application and/or the stateless infrastructure may employ a particular arrangement of keys to encrypt and decrypt the data. Such particular arrangement of keys may be critical because it enables the client application and/or the stateless infrastructure to provide data storage services (e.g., protect stored data) without having access to and/or storing unencrypted data.

Further, based at least in part on registering the account, the stateless infrastructure may enable the user device to correlate the registered account with another account (e.g., emergency account) registered with the stateless infrastructure by another user device. As a result, when credentials associated with accessing the registered account become unrecoverable, the stateless infrastructure may enable restoration of access to the registered account based at least in part on utilizing the emergency account. In some aspects, as discussed in further detail below, the user device may encrypt a private key associated with the user device and/or the registered account by utilizing a public key associated with the emergency account. As a result, when the credentials become unrecoverable, the stateless infrastructure may enable the emergency account to gain access to the registered account of the user device, thereby restoring access to the registered account and/or to the stored data.

In this way, the client application and/or the stateless infrastructure may mitigate instances of the stored data becoming compromised and may restore access to the registered account and/or to the stored data when associated credentials become unrecoverable, thereby enabling efficient utilization of resources (e.g., management resources, memory resources, computational/processing resources, power consumption resources, system bandwidth, network resources, etc.) associated with the user device and/or the stateless infrastructure for suitable tasks related to the data storage services.

In some aspects, a client application associated with a first user device may determine encrypted content by encrypting content based at least in part on utilizing a first private key associated with the first user device; encrypt the first private key based at least in part on utilizing a second public key associated with a second user device; and transmit, to a storage device, the encrypted content and the encrypted first private key for storage in association with a first account registered by the first user device with the infrastructure device. Further, a client application associated with the second user device may receive, from the storage device, access to the encrypted content and the encrypted first private key based at least in part on a determination that the first user device is unable to access the encrypted content; decrypt the encrypted first private key and the encrypted content based at least in part on utilizing a second private key associated with the second user device; and transmit, to the first user device, the content to restore access to the content by the first user device.

FIG. 2 is an illustration of an example flow 200 associated with a stateless system to restore access, according to various aspects of the present disclosure. The example flow 200 may include a user device 102 in communication with a stateless infrastructure 110. In some aspects, the user device 102 may install a client application 104 configured and provided by the stateless infrastructure 110 and may use the client application 104 to communicate with an application programming interface (API) and a processor (e.g., processing unit 112, processor 720) associated with the stateless infrastructure 110. In some aspects, the user device 102 and the stateless infrastructure may communicate over a network (e.g., network 120).

As shown by reference numeral 210, the user device 102 may register an account with the stateless infrastructure 110. In some aspects, during the registration, the user device 102 may provide registration information such as, for example, identity of an owner of the user device 102, a phone number associated with the user device 102, an email address associated with the user device 102, or a combination thereof. In some aspects, the user device 102 may set up an access system including, for example, username, password, or the like to subsequently gain access to the registered account.

In some aspects, the stateless infrastructure 110 may configure and provide the client application 104 to be installed on the user device 102. The client application 104 may enable the user device 102 to receive information to be processed by the client application 104 and/or by the stateless infrastructure 110. The client application 104 may include a graphical interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the client application 104 may activate and/or enable, at a time associated with the registration (e.g., after the registration) and/or logging in for access, the graphical interface for receiving the information. For instance, the client application 104 may cause a screen (e.g., local screen) associated with the user device 102 to display, for example, a pop-up message to request entry of the information. Further, the client application 104 may enable transmission of at least a portion of the information to the stateless infrastructure 110.

As shown by reference numeral 220, the client application 104 may determine information based at least in part on the registration of the account with the stateless infrastructure 110. In an example, the client application 104 may determine an asymmetric assigned key pair for the registered account associated with user device 102. In some aspects, the assigned key pair may be unique to the registered account and may include an assigned public key and an assigned private key. In this way, the assigned public key and the assigned private key may be user device-specific and/or account-specific. The assigned public key and the assigned private key may be associated with each other via, for example, a mathematical function. As a result, data encrypted using the assigned public key may be decrypted by utilizing the assigned private key.

Further, the client application 104 may set up credentials in the form of a master string of alphanumeric characters from the user device 102. The user device 102 may utilize the master string to gain access to the registered account and/or to stored data. In some aspects, the master string may be unique and be associated with the registered account. Based at least in part on receiving the master string, the client application 104 may determine a master key. In some aspects, the client application 104 may utilize a password derivation function and/or a key derivation function to determine the master key based at least in part on the master string. The password derivation function and/or the key derivation function may perform password hashing to determine the master key. The client application 104 may utilize the master key to encrypt the assigned private key associated with the registered account.

As shown by reference numeral 230, when the user device 102 wishes to encrypt and store data, the client application 104 may determine a symmetric key and an access key pair. In some aspects, the client application 104 may determine respective symmetric keys and respective access key pairs for each piece of data (e.g., content) that the user device 102 may wish to encrypt. In this way, the symmetric key and the access key pair may be content-specific. Examples of content may include any information including, for example, alphanumeric data such as passwords, credit card numbers, bank account numbers, etc. and/or information that is written, printed, and/or electronically included in documents and/or files such as photographs, or processing documents, CDs, DVDs, etc.

For given content, the client application 104 may utilize a random bit generator to determine the symmetric key. In this case, the symmetric key may be a random key including a sequence of unpredictable and unbiased information. Further, the client application 104 may determine an access key pair including an access public key and an access private key. The access public key and the access private key may be associated with each other via, for example, a mathematical function. As a result, data encrypted using the access public key may be decrypted by utilizing the access private key.

The client application 104 may utilize the symmetric key, the access public key, and the assigned public key to encrypt the content. In an example, the client application 104 may encrypt the content using the symmetric key. The client application 104 may encrypt the symmetric key using the access public key. The client application 104 may encrypt the access private key using the assigned public key associated with the registered account.

In some aspects, the client application 104 may enable the user device 102 to store the encrypted content. For instance, the user device 102 may store the encrypted content locally and/or remotely. In an example, the user device 102 may store the encrypted content in a local memory and/or a remote memory associated with the user device 102. In another example, the user device 102 may store the encrypted content in a data storage associated with data storage services provided by the stateless infrastructure 110. In yet another example, the user device 102 may store the encrypted content in a hand-held memory (e.g., a USB thumb drive, flash drive, etc.).

As shown by reference numeral 240, the client application 104 may transmit, and the stateless infrastructure 110 may receive, at least a portion of the information determined by the client application 104. For instance, the client application 104 may transmit one or more of the assigned public key, the encrypted assigned private key, access public key, the encrypted access private key, the encrypted symmetric key, and/or the encrypted content to the stateless infrastructure 110. The stateless infrastructure 110 may store the received information in association with the registered account associated with the user device 102.

When the user device 102 (or the other device associated with the registered account) may wish to access and/or decrypt the encrypted content, as shown by reference numeral 250, the user device 102 (e.g., or the other device) may transmit an access request to access the registered account. Based at least in part on receiving the access request, as shown by reference numeral 260, the stateless infrastructure 110 may transmit, and the client application 104 may receive, the encrypted assigned private key. In some aspects, as also shown by reference numeral 260, when the user device 102 and/or the other device may not have access to the encrypted content, the stateless infrastructure 110 may also transmit the assigned public key, the access public key, encrypted access private key, the encrypted symmetric key, and the encrypted content to the user device 102 and/or the other device.

Based at least in part on receiving the assigned public key, the access public key, the encrypted assigned private key, the encrypted access private key, the encrypted symmetric key, and the encrypted content, the client application 104 may be enabled to decrypt the content. For instance, the client application 104 may request credentials in the form of the master string. Based at least in part on receiving the master string, the client application 104 may determine the master key that was utilized to encrypt the assigned private key. The client application 104 may utilize the master key to decrypt the assigned private key. The client application 104 may utilize the assigned private key to decrypt the encrypted access private key based at least in part on an association between the assigned private key and the assigned public key. Further, the client application 104 may utilize the access private key to decrypt the symmetric key based at least in part on an association between the access private key and the access public key. As shown by reference numeral 270, the client application 104 may utilize the symmetric key to decrypt the content.

In some aspects, one or more functionalities performed by the client application 104 may be included in and/or may be performed by the stateless infrastructure 110, and vice versa.

By utilizing the above critical arrangement, the stateless infrastructure 110 may enable the client application 104 and/or the stateless infrastructure 110 to provide data storage services (e.g., protect data) without having access to and/or storing unencrypted content and/or unencrypted keys. For instance, the stateless infrastructure 110 may not have access to and/or store information such as the master string, the master key, access key pair, content, etc. may not be stored in unencrypted form.

As indicated above, FIG. 2 is provided as an example. Other examples may differ from what is described with regard to FIG. 2.

FIG. 3 is an illustration of an example flow 300 associated with a stateless system to restore access, according to various aspects of the present disclosure. The example flow 300 may include a plurality of user devices 102 (e.g., first user device, second user device, etc.) in communication with a stateless infrastructure 110. In some aspects, the user devices 102 may be associated with respective registered accounts with the stateless infrastructure 110. Further, the user devices 102 may install respective client applications 104 configured and provided by the stateless infrastructure 110. The user devices 102 may utilize the respective client applications 104 to communicate with an application programming interface (API) and a processor (e.g., processing unit 112, processor 720) associated with the stateless infrastructure 110. In some aspects, the user devices 102 and the stateless infrastructure may communicate over a network (e.g., network 120).

As discussed above with respect to FIG. 2, a user device 102 (e.g., first user device) may register an account (e.g., first registered account) with the stateless infrastructure 110. Based at least in part on registering the first registered account, as shown by reference numeral 310, the first user device may provide information regarding another user device 102 (e.g., second user device) having a respective registered account (e.g., second registered account) with the stateless infrastructure 110. Such information regarding the second user device and/or second registered account may include, for example, information utilized by the second user device to register the second registered account with the stateless infrastructure 110. Some examples of such information may include an identity of an owner of the second user device, a phone number associated with the second user device, an email address associated with the second user device, or a combination thereof.

As shown by reference numeral 320, based at least in part in receiving the information regarding the second user device, the stateless infrastructure 110 may utilize the received information to verify the second registered account (e.g., the verify whether the second registered account has been registered by the second user device with the stateless infrastructure 110). In some aspects, the stateless infrastructure 110 may verify the second registered account based at least in part on comparing the received information with registration information associated with registered accounts. When the received information matches registration information associated with the second registered account, the stateless infrastructure 110 determines that the second registered account has been verified.

When the received information fails to match the registration information associated with registered accounts, the stateless infrastructure 110 determines that the second registered account has not yet been registered. In this case, the stateless infrastructure 110 may request the second user device to register the second registered account with the stateless infrastructure 110 and then verify the second registered account.

Based at least in part on successfully verifying the second registered account, the stateless infrastructure 110 may transmit a verification message to the first user device indicating that the second registered account has been verified. In some aspects, the stateless infrastructure 110 may also transmit a public key (e.g., second assigned public key) associated with the second user device and/or the second registered account to the first user device. In some aspects, prior to transmitting the verification message to the first user device, the stateless infrastructure 110 may receive approval from the second user device for the second registered account to be correlated with the first registered account.

Based at least in part on determining that the second registered account has been verified, the first user device may encrypt a private key (e.g., first assigned private key) associated with the first user device by utilizing the second assigned public key. Further, as shown by reference numeral 330, the first user device may transmit the encrypted first assigned private key to the stateless infrastructure 110 for storage.

As shown by reference numeral 340, based at least in part on receiving the encrypted first assigned private key, the stateless infrastructure 110 may correlate the second user device and/or the second registered account with the first user device and/or the first registered account such that the second registered account may be utilized to restore access to the first registered account when credentials associated with accessing the first registered account and/or stored data become unrecoverable. Further, the stateless infrastructure 110 may store the encrypted first assigned private key in association with the correlation between the first registered account and the second registered account. In some aspects, the stateless infrastructure 110 may store the correlation and/or the encrypted first assigned private key in a memory (e.g., database 114) associated with the stateless infrastructure 110.

In some aspects, the credentials (e.g., master string) associated with accessing the first registered account may become unrecoverable. In an example, an owner of the first user device may have lost/misplaced the credentials. In this case, the first user device may transmit a message to the stateless infrastructure 110 indicating that the credentials (e.g., master password) have become unrecoverable. Based at least in part on receiving the message, the stateless infrastructure 110 may reference the correlation between the first registered account and the second registered account to determine that the second user device is to be utilized to restore access to the first registered account. In this case, as shown by reference numeral 350, the stateless infrastructure 110 and the second user device may conduct restoration communication. In an example, the stateless infrastructure 110 may transmit a restoration message to the second user device requesting the second user device to submit a restoration request associated with the first registered account.

In another example, the second user device may determine that the credentials associated with accessing the first registered account have become unrecoverable. In an example, an owner of the second user device may determine that an owner of the first user device has lost/misplaced the credentials or that the owner of the first user device has become incapacitated. In this case, the second user device may transmit the restoration request to the stateless infrastructure 110 to restore access to the first registered account and/or to the stored data.

In some aspects, the second user device may access (e.g., login to) the second registered account prior to transmitting the restoration request to the stateless infrastructure 110. In some aspects, the restoration request may include identifying information to identify the first registered account as the account for which access is to be restored. Such identifying information may include, for example, identity of the owner of the first user device, a phone number associated with the first user device, an email address associated with the first user device, or a combination thereof.

Based at least in part on receiving the restoration request from the second user device, the stateless infrastructure 110 may reference the correlation between the first registered account and the second registered account to determine that the second user device is authorized to restore access to the first registered account. Based at least in part on determining that the second user device is authorized to restore access to the first registered account, as shown by reference numeral 360, the stateless infrastructure 110 and the first user device may conduct approval communication.

In an example, the stateless infrastructure 110 may transmit an approval message to the first user device requesting approval to allow the second user device to access the first registered account. In some aspects, the stateless infrastructure 110 may configure the approval message to be associated with a validity interval of time (e.g., 1 week, 2 weeks, 1 month, etc.) for which the approval message is valid. In some aspects, the validity interval of time may indicate an amount of time within which the first user device is to transmit a response to the approval message to the stateless infrastructure 110. When the stateless infrastructure 110 fails to receive the response to the approval message from the first user device within the validity interval of time, the stateless infrastructure 110 may determine that the credentials for accessing the first registered account have become unrecoverable because, for example, the owner of the first user device has become incapacitated.

In another example, when the credentials for accessing the first registered account have been lost and/or misplaced, the first user device may transmit a response to the approval message, the response indicating approval of the second user device to access the first registered account. In some aspects, the first user device may determine in real-time and indicate a duration of time (e.g., 5 minutes, 30 minutes, 3 hours, 1 day, 3 days, 1 week, etc.) for which the approval is valid. In other words, the first user device may determine and indicate a duration of time within which the second user device is to restore access of the first user device to the first registered account and/or stored data. In some aspects, the second user device may be authorized to access the first registered account until an expiration of the given duration of time. In this way, by limiting access of the second device to the first registered account and/or stored data, the first user device may mitigate instances of unauthorized access by another device masquerading as the second user device.

As shown by reference numeral 370, the stateless infrastructure 110 and/or the second user device may enable restoration of access to the first registered account.

In an example, when the stateless infrastructure 110 fails to receive the response to the approval message from the first user device within the validity interval of time and determines that the credentials for accessing the first registered account have become unrecoverable, at an expiration of the validity interval of time, the stateless infrastructure 110 may transmit an access message to the second user device. In some aspects, the stateless infrastructure 110 may enable access of the second user device to the encrypted content and the encrypted first assigned private key. In an example, the stateless infrastructure 110 may retrieve the encrypted first assigned private key from the memory, and may transmit the retrieved encrypted first assigned private key to the second user device in association with the access message. Further, the stateless infrastructure 110 may retrieve the encrypted content associated with the first registered account, and may transmit the retrieved encrypted content to the second user device in association with the access message.

In another example when the credentials for accessing the first registered account have been lost and/or misplaced, the first user device may transmit a response to the approval message, the response indicating approval of the second user device to access the first registered account. In some aspects, the first user device may determine and indicate a duration of time (e.g., 5 minutes, 30 minutes, 3 hours, 1 day, 3 days, 1 week, etc.) for which the approval is valid. In other words, the first user device may determine and indicate a duration of time within which the second user device is authorized to access the first registered account and/or the stored data. In this case, the stateless infrastructure 110 may transmit the access message to the second user device and indicate the duration of time within which the second user device is to access the first registered account. In some aspects, the stateless infrastructure 110 may enable access of the second user device to the encrypted content and the encrypted first assigned private key. In an example, the stateless infrastructure 110 may retrieve the encrypted first assigned private key from the memory, and may make the retrieved encrypted first assigned private key available to the second user device for the indicated duration of time. Further, the stateless infrastructure 110 may retrieve the encrypted content associated with the first registered account, and may make the retrieved encrypted content available to the second user device for the indicated duration of time.

Based at least in part on receiving the access message and/or the encrypted first assigned private key and/or the encrypted content, the second user device may determine whether the access message indicates the duration of time within which the second user devices to access the first registered account and/or stored data. When the second user device determines that the access message indicates the duration of time, the second user device may access the first registered account and/or store data within the indicated duration of time. In some aspects, the second user device may access the first registered account and/or stored data by decrypting the encrypted content and/or transmitting the decrypted content to the first user device within the indicated duration of time.

To decrypt the encrypted content, the second user device may decrypt the encrypted first assigned private key associated with the first registered account. For instance, the second user device may utilize a second assigned private key associated with the second registered account to decrypt the encrypted first assigned private key. In some aspects, the second user device may utilize the association between the second assigned public key and the second assigned private key to decrypt the encrypted first assigned private key.

The second user device may utilize the first assigned private key to decrypt the encrypted access private key based at least in part on an association between the first assigned private key and the first assigned public key. Further, the second user device may utilize the access private key to decrypt the symmetric key based at least in part on an association between the access private key and the access public key. The second user device may utilize the symmetric key to decrypt the content.

The second user device may provide the decrypted content to the first user device within the indicated duration of time. In this way, access of the first user device to the content may be restored. Based at least in part on receiving the content associated with the first registered account, the first user device may request to reset the credentials for accessing the first registered account and/or the stored data. In some aspects, while resetting the credentials, the stateless infrastructure 110 may delete all encrypted content and keys associated with the first registered account. Because the first user device has received the content from the second user device, the first user device may not lose any content.

In some aspects, resetting the credentials may include the first user device determining a new master string, based on which the client application 104 may determine a new master key and/or the assigned key pair associated with the first user device. Based at least in part on resetting of the credentials, access to the first registered account may be restored such that the first user device may encrypt and store data in association with the first registered account.

In this way, aspects and techniques discussed herein enable restoration of access to a registered account and/or stored data when associated credentials become unrecoverable while mitigating instances of stored data becoming compromised, thereby enabling efficient utilization of resources (e.g., management resources, memory resources, computational/processing resources, power consumption resources, system bandwidth, network resources, etc.) associated with the user device and/or the stateless infrastructure for suitable tasks related to the data storage services.

As indicated above, FIG. 3 is provided as an example. Other examples may differ from what is described with regard to FIG. 3.

FIG. 4 is an illustration of an example process 400 associated with a stateless system to restore access, according to various aspects of the present disclosure. In some aspects, the process 400 may be performed by memories and/or processors (e.g., processor 106, processor 720) associated with one or more user devices (e.g., user device 102) executing respective client applications. As shown by reference numeral 410, process 400 may include determining, by a first user device, encrypted content by encrypting content based at least in part on utilizing a first private key associated with the first user device. For instance, a first user device may utilize the associated memory and processor to determine encrypted content by encrypting content based at least in part on utilizing a first private key associated with the first user device, as discussed elsewhere herein.

As shown by reference numeral 420, process 400 may include encrypting, by the first user device, the first private key based at least in part on utilizing a second public key associated with a second user device. For instance, the first user device may utilize the associated memory and processor to encrypt the first private key based at least in part on utilizing a second public key associated with a second user device, as discussed elsewhere herein.

As shown by reference numeral 430, process 400 may include transmitting, by the first user device to a storage device, the encrypted content and the encrypted first private key for storage in association with a first account registered by the first user device with the infrastructure device. For instance, the first user device may utilize an associated communication interface (e.g., communication interface 770) with the associated memory and processor to transmit, to a storage device, the encrypted content and the encrypted first private key for storage in association with a first account registered by the first user device with the infrastructure device, as discussed elsewhere herein.

As shown by reference numeral 440, process 400 may include receiving, by the second user device from the storage device, the encrypted content and the encrypted first private key based at least in part on a determination that the first user device is unable to access the encrypted content. For instance, a second user device may utilize the associated communication interface, memory, and processor to receive, from storage device, the encrypted content and the encrypted first private key based at least in part on a determination that the first user device is unable to access the encrypted content, as discussed elsewhere herein.

As shown by reference numeral 450, process 400 may include decrypting, by the second user device, the encrypted first private key and the encrypted content based at least in part on utilizing a second private key associated with the second user device. For instance, the second user device may utilize the associated memory and processor to decrypt the encrypted first private key and the encrypted content based at least in part on utilizing a second private key associated with the second user device, as discussed elsewhere herein.

As shown by reference numeral 460, process 400 may include transmitting, by the second user device to the first user device, the content to restore access to the content by the first user device. For instance, the second user device may utilize the associated communication interface, memory, and processor to transmit, to the first user device, the content to restore access to the content by the first user device, as discussed elsewhere herein.

Process 400 may include additional aspects, such as any single aspect or any combination of aspects described below and/or in connection with one or more other processes described elsewhere herein.

In a first aspect, in process 400, decrypting the encrypted first private key and the encrypted content includes the second user device decrypting the encrypted first private key and the encrypted content within a duration of time determined by the first user device.

In a second aspect, alone or in combination with the first aspect, in process 400, receiving the encrypted content and the encrypted first private key includes the second user device receiving the encrypted content and the encrypted first private key based at least in part on failure of the first user device to approve reception of the encrypted content and the encrypted first private key by the second user device prior to expiration of a given interval of time.

In a third aspect, alone or in combination with the first through second aspects, process 400 may include transmitting, by the first user device to the infrastructure device, identification information identifying the second user device, and receiving, by the first user device from the infrastructure device, the second public key based at least in part on transmitting the identification information.

In a fourth aspect, alone or in combination with the first through third aspects, process 400 may include transmitting, by the second user device, a restoration request to receive access to the encrypted content and the encrypted first private key.

In a fifth aspect, alone or in combination with the first through fourth aspects, process 400 may include transmitting, by the first user device, an approval for the second user device to receive access to the encrypted content and the encrypted first private key.

In a sixth aspect, alone or in combination with the first through fifth aspects, process 400 may include encrypting, by the first user device, the first assigned private key by utilizing a master key that is determined based at least in part on a master string of alphanumeric characters.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with a stateless system to restore access, according to various aspects of the present disclosure. In some aspects, the process 500 may be performed by a memory and/or a processor (e.g., processing unit 112, processor 720) associated with a stateless infrastructure (e.g., stateless infrastructure 110). As shown by reference numeral 510, process 500 may include receiving, by an infrastructure device from a first user device, encrypted content and an encrypted first private key for storage in association with a first account registered by the first user device with the infrastructure device. For instance, the stateless infrastructure may utilize an associated communication interface (e.g., communication interface 770) with the associated memory and processor to receive, from a first user device, encrypted content and an encrypted first private key for storage in association with a first account registered by the first user device with the infrastructure device, as discussed elsewhere herein.

As shown by reference numeral 520, process 500 may include receiving, by the infrastructure device from the first user device, identification information identifying a second user device. For instance, the stateless infrastructure may utilize the associated communication interface, memory, and processor to receive, from the first user device, identification information identifying a second user device, as discussed elsewhere herein.

As shown by reference numeral 530, process 500 may include receiving, by the infrastructure device from the second user device, a restoration request to access the first account based at least in part on a determination that the first user device is unable to access the stored encrypted content. For instance, the stateless infrastructure may utilize the associated communication interface, memory, and processor to receive, from the second user device, a restoration request to access the first account based at least in part on a determination that the first user device is unable to access the stored encrypted content, as discussed elsewhere herein.

As shown by reference numeral 540, process 500 may include enabling, by the infrastructure device based at least in part on receiving the identification information and the restoration request, access of the second user device to the encrypted content and the encrypted first private key to enable the second user device to decrypt the encrypted content. For instance, the stateless infrastructure may utilize the associated memory and processor enabled, based at least in part on receiving the identification information and the restoration request, access of the second user device to the encrypted content and the encrypted first private key to enable the second user device to decrypt the encrypted content, as discussed elsewhere herein.

Process 500 may include additional aspects, such as any single aspect or any combination of aspects described below and/or in connection with one or more other processes described elsewhere herein.

In a first aspect, in process 500, receiving the encrypted first private key includes receiving the encrypted first private key determined by encrypting the first private key based at least in part on utilizing a second public key associated with the second user device.

In a second aspect, alone or in combination with the first aspect, process 500 may include determining a correlation between the first user device and the second user device based at least in part on receiving the identification information, the correlation indicating that access of the second user device to the encrypted content and the encrypted first private key is to be enabled when the first user device is unable to access the stored encrypted content.

In a third aspect, alone or in combination with the first through second aspects, process 500 may include storing the encrypted content and the encrypted first private key in association with a correlation between the first user device and the second user device, the correlation indicating that the second user device is to be utilized to restore access of the first user device to the encrypted content.

In a fourth aspect, alone or in combination with the first through third aspects, process 500 may include receiving, from the first user device, indication of a duration of time for which the infrastructure device is to enable access of the second user device to the encrypted content and the encrypted first private key.

In a fifth aspect, alone or in combination with the first through fourth aspects, in process 500, enabling the access includes enabling the access of the second user device to the encrypted content and the encrypted first private key for a given duration of time set by the first user device.

In a sixth aspect, alone or in combination with the first through fifth aspects, in process 500, enabling the access includes transmitting the encrypted content and the encrypted first private key based at least in part on a failure of the first user device to approve reception of the encrypted content and the encrypted first private key by the second user device prior to expiration of a given interval of time set by the infrastructure device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with a stateless system to restore access, according to various aspects of the present disclosure. In some aspects, the process 600 may be performed by a memory and/or processor (e.g., processor 106, processor 720) associated with a user device (e.g., user device 102) executing a client application. As shown by reference numeral 610, process 600 may include receiving, by the second user device from a storage device, access to encrypted content and an encrypted first private key, the encrypted content being determined by encrypting content based at least in part on utilizing a first private key associated with the first user device and the encrypted first private key being determined by encrypting the first private key based at least in part on utilizing a second public key associated with the second user device. For instance, a second user device may utilize an associated communication interface (e.g., communication interface 770), with the associated memory and processor to receive, from a storage device, access to encrypted content and an encrypted first private key, the encrypted content being determined by encrypting content based at least in part on utilizing a first private key associated with the first user device and the encrypted first private key being determined by encrypting the first private key based at least in part on utilizing a second public key associated with the second user device, as discussed elsewhere herein.

As shown by reference numeral 620, process 600 may include determining, by the second user device, that the second user device is to restore access of the first user device to the content within a given duration of time set by the first user device. For instance, the second user device may utilize the associated memory and processor to determine that the second user device is to restore access of the first user device to the content within a given duration of time set by the first user device, as discussed elsewhere herein.

As shown by reference numeral 630, process 600 may include decrypting, by the second user device, the encrypted first private key based at least in part on utilizing a second private key associated with the second user device. For instance, the second user device may utilize the associated memory and processor to decrypt the encrypted first private key based at least in part on utilizing a second private key associated with the second user device, as discussed elsewhere herein.

As shown by reference numeral 640, process 600 may include decrypting, by the second user device, the encrypted content based at least in part on utilizing the first private key associated with the first user device to determine the content. For instance, the second user device may utilize the associated memory and processor to decrypt the encrypted content based at least in part on utilizing the first private key associated with the first user device to determine the content, as discussed elsewhere herein.

As shown by reference numeral 650, process 600 may include decrypting, by the second user device, the encrypted first private key and the encrypted content based at least in part on utilizing a second private key associated with the second user device. For instance, the second user device may utilize the associated memory and processor to decrypt the encrypted first private key and the encrypted content based at least in part on utilizing a second private key associated with the second user device, as discussed elsewhere herein.

As shown by reference numeral 660, process 600 may include transmitting, by the second user device within the given duration of time, the content to the first user device. For instance, the second user device may utilize the associated communication interface, memory, and processor to transmit, within the given duration of time, the content to the first user device, as discussed elsewhere herein.

Process 600 may include additional aspects, such as any single aspect or any combination of aspects described below and/or in connection with one or more other processes described elsewhere herein.

In a first aspect, in process 600, receiving access to the encrypted content and the encrypted first private key includes receiving access to the encrypted content and the encrypted first private key based at least in part on a determination that the first user device is unable to access the encrypted content.

In a second aspect, alone or in combination with the first aspect, in process 600, receiving access to the encrypted content and the encrypted first private key includes receiving access to the encrypted content and the encrypted first private key based at least in part on failure of the first user device to approve reception of the encrypted content and the encrypted first private key by the second user device prior to expiration of a given interval of time.

In a third aspect, alone or in combination with the first through second aspects, in process 600, receiving access to the encrypted content and the encrypted first private key includes receiving access to the encrypted content and the encrypted first private key based at least in part on the second user device transmitting, to the storage device, a restoration request for requesting access to the encrypted content and the encrypted first private key.

In a fourth aspect, alone or in combination with the first through third aspects, process 600 may include transmitting, to the storage device, a restoration request for requesting access to the encrypted content and the encrypted first private key, the restoration request identifying the first user device or a first registered account registered by the first user device with the storage device.

In a fifth aspect, alone or in combination with the first through fourth aspects, process 600 may include determining that the first user device is unable to access the encrypted content; and transmitting, to the storage device, a restoration request to request access to the encrypted content and the encrypted first private key based at least in part on determining that the first user device is unable to access the encrypted content.

In a sixth aspect, alone or in combination with the first through fifth aspects, process 600 may include decrypting an encrypted content access private key associated with the content based at least in part on utilizing the first private key; decrypting an encrypted symmetric key associated with the content based at least in part on utilizing the content access private key; and decrypting the encrypted content based at least in part on utilizing the symmetric key.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, or the like described elsewhere herein (e.g., FIG. 1 and/or FIG. 2) and may be used to perform the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    determining, by a first user device, encrypted content by encrypting content based at least in part on utilizing a first private key associated with the first user device;
    encrypting, by the first user device, the first private key based at least in part on utilizing a second public key associated with a second user device;
    transmitting, by the first user device to a storage device, the encrypted content and the encrypted first private key for storage in association with a first account registered by the first user device with the infrastructure device;
    receiving, by the second user device from the storage device, access to the encrypted content and the encrypted first private key based at least in part on a determination that the first user device is unable to access the encrypted content;
    decrypting, by the second user device, the encrypted first private key and the encrypted content based at least in part on utilizing a second private key associated with the second user device; and
    transmitting, by the second user device to the first user device, the content to restore access of the first user device to the content.

2. The method of claim 1, wherein decrypting the encrypted first private key and the encrypted content includes the second user device decrypting the encrypted first private key and the encrypted content within a duration of time determined by the first user device.

3. The method of claim 1, wherein receiving access to the encrypted content and the encrypted first private key includes the second user device receiving access to the encrypted content and the encrypted first private key based at least in part on failure of the first user device to approve reception of the encrypted content and the encrypted first private key by the second user device prior to expiration of a given interval of time.

4. The method of claim 1, further comprising:
    transmitting, by the first user device to the infrastructure device, identification information identifying the second user device, and
    receiving, by the first user device from the infrastructure device, the second public key based at least in part on transmitting the identification information.

5. The method of claim 1, further comprising:
    transmitting, by the second user device, a restoration request to receive access to the encrypted content and the encrypted first private key.

6. The method of claim 1, further comprising:
    encrypting, by the first user device, the first assigned private key by utilizing a master key that is determined based at least in part on a master string of alphanumeric characters.

7. The method of claim 1, further comprising:
    transmitting, by the first user device, an approval for the second user device to receive access to the encrypted content and the encrypted first private key.

8. A system, comprising:
    a first user device; and
    a second user device associated with the first user device, wherein the first user device is configured to determine encrypted content by encrypting content based at least in part on utilizing a first private key associated with the first user device;

the first user device is configured to encrypt the first private key based at least in part on utilizing a second public key associated with a second user device;

the first user device is configured to transmit, to a storage device, the encrypted content and the encrypted first private key for storage in association with a first account registered by the first user device with the infrastructure device;

the second user device is configured to receive, from the storage device, access to the encrypted content and the encrypted first private key based at least in part on a determination that the first user device is unable to access the encrypted content;

the second user device is configured to decrypt the encrypted first private key and the encrypted content based at least in part on utilizing a second private key associated with the second user device; and the second user device is configured to transmit, to the first user device, the content to restore access of the first user device to the content.

9. The system of claim 8, wherein, to decrypt the encrypted first private key and the encrypted content, the second user device is configured to decrypt the encrypted first private key and the encrypted content within a duration of time determined by the first user device.

10. The system of claim 8, wherein, to receive access to the encrypted content and the encrypted first private key, the second user device is configured to receive access to the encrypted content and the encrypted first private key based at least in part on failure of the first user device to approve reception of the encrypted content and the encrypted first private key by the second user device prior to expiration of a given interval of time.

11. The system of claim 8, wherein the first user device is configured to:

transmit, to the infrastructure device, identification information identifying the second user device, and receive, from the infrastructure device, the second public key based at least in part on transmitting the identification information.

12. The system of claim 8, wherein the second user device is configured to:

transmit a restoration request to receive access to the encrypted content and the encrypted first private key.

13. The system of claim 8, wherein the first user device is configured to:

encrypt the first assigned private key by utilizing a master key that is determined based at least in part on a master string of alphanumeric characters.

14. The system of claim 8, wherein the first user device is configured to:

transmit an approval for the second user device to receive access to the encrypted content and the encrypted first private key.

15. A non-transitory computer-readable medium configured to store instructions, which when executed by a first user device, configure the first user device to:

determine encrypted content by encrypting content based at least in part on utilizing a first private key associated with the first user device;

encrypt the first private key based at least in part on utilizing a second public key associated with a second user device; and transmit, to a storage device, the encrypted content and the encrypted first private key for storage in association with a first account registered by the first user device with the infrastructure device; and when executed by a second user device, configure the second user device to:

receive, from the storage device, access to the encrypted content and the encrypted first private key based at least in part on a determination that the first user device is unable to access the encrypted content;

decrypt the encrypted first private key and the encrypted content based at least in part on utilizing a second private key associated with the second user device; and transmit, to the first user device, the content to restore access of the first user device to the content.

16. The non-transitory computer-readable medium of claim 15, wherein, to decrypt the encrypted first private key and the encrypted content, the second user device is configured to decrypt the encrypted first private key and the encrypted content within a duration of time determined by the first user device.

17. The non-transitory computer-readable medium of claim 15, wherein, to receive access to the encrypted content and the encrypted first private key, the second user device is configured to receive access to the encrypted content and the encrypted first private key based at least in part on failure of the first user device to approve reception of the encrypted content and the encrypted first private key by the second user device prior to expiration of a given interval of time.

18. The non-transitory computer-readable medium of claim 15, wherein the first user device is configured to:

transmit, to the infrastructure device, identification information identifying the second user device, and receive, from the infrastructure device, the second public key based at least in part on transmitting the identification information.

19. The non-transitory computer-readable medium of claim 15, wherein the second user device is configured to:

transmit a restoration request to receive access to the encrypted content and the encrypted first private key.

20. The non-transitory computer-readable medium of claim 15, wherein the first user device is configured to:

encrypt the first assigned private key by utilizing a master key that is determined based at least in part on a master string of alphanumeric characters.

* * * * *